Figure 1:
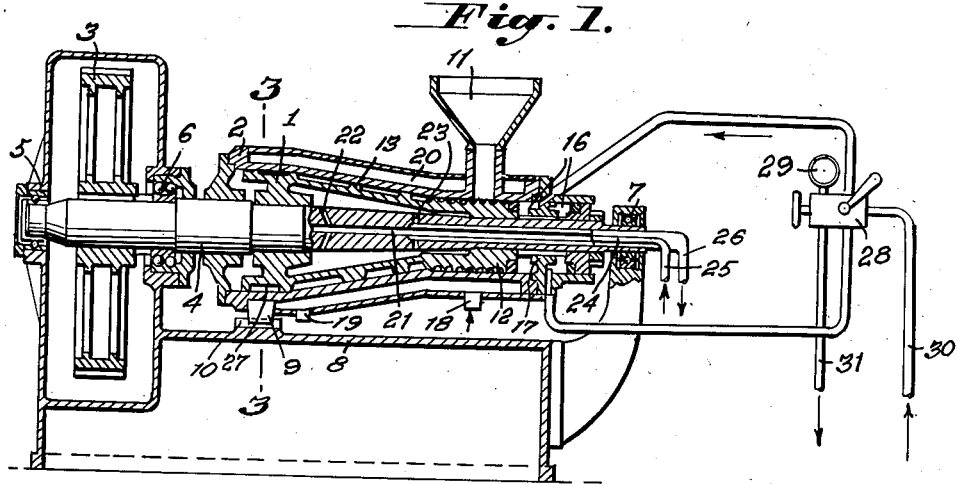

Jan. 1, 1952            A. KRUZIK            2,581,031
MACHINE FOR THE HOMOGENIZATION OF
PLASTIC MASSES
Filed Dec. 11, 1947

INVENTOR.
Arnost Kruzik
BY
Attorneys

Patented Jan. 1, 1952

2,581,031

UNITED STATES PATENT OFFICE 2,581,031

MACHINE FOR THE HOMOGENIZATION OF PLASTIC MASSES

Arnošt Kruzik, Zlin, Czechoslovakia, assignor to Bata Národní Podnik, Zlin, Czechoslovakia Application December 11, 1947, Serial No. 791,044
In Czechoslovakia December 14, 1946

2 Claims. (Cl. 18—2)

This invention relates to a machine for homogenizing plastic masses, more particularly regenerated rubber. The doughy, plastic mass leaves the machine with constant homogeneity and fineness of structure.

Hitherto the refining or homogenization, more particularly of regenerated rubber, has been carried out in special rolling mills. The amorphous, plastic mass was rolled in a narrow space between a pair of rolls running at different circumferential speeds. The different circumferential speeds caused a rubbing down and a consequent fining down of the mass between the almost touching rolls. In order to obtain the requisite degree of fineness and homogeneity, it was necessary for the mass to pass several times between the rolls. In working up the mass, which normally entailed passing it up to ten times between the rolls, this signifies that the mass had to be returned up to ten times to the rolling mill or that an arrangement was required (that is a system of rolls) containing, for instance, ten pairs of rolls. The first case involves a loss of time and the second case a costly arrangement.

The machine according to the present invention is substantially analogous to extrusion machines of a known kind, which are used in the usual manner for working up rubber. Such a machine can entirely replace the rolling mill referred to above and has the advantage of being considerably lighter and taking up far less space. The fining down is more perfect and the mass runs through the machine uninterruptedly and continuously, that is to say, it is not necessary to return the mass to the machine, as was the case in the hitherto known rolling mills.

The essential feature of the invention resides in the arrangement of an endless screw or worm, and a casing in which it works. The worm is provided, between the ribs forming its convolutions, with bridging pieces which break the continuity of the helical groove of the worm. When the worm is multiple-threaded, the individual ribs forming the threads run next to one another and the bridging pieces are arranged between them. The manner in which the bridging pieces operate will be understood if a worm without bridging pieces be considered. In such a case the mass will pass through the helical space between the ribs formed by the thread in the normal manner, as in the case of a conveyor worm. When the worm is provided with bridging pieces, however, these form an obstacle to the passage of the mass through the entire depth of the helical space between the ribs, and the mass is constrained to pass through the narrow gaps between the bridging pieces and the wall of the casing, the mass being carried along by the bridging pieces, which rotate with the worm, and rubbed down against the wall of the casing, and thereby fined down. In order to enable the gap between the worm and the casing wall to be adjusted according to requirement, the worm as well as the hollow space within the casing will suitably be made conical. The longitudinal displacement between the working casing and the worm, which will then be necessary, may be effected by means of a hydraulic pressure arrangement.

Figure 2:

A constructional example according to the invention is illustrated in the accompanying drawing, in which:

Figure 1 is a diagrammatic representation of the machine in section along the axis of rotation;

Figure 2 a perspective view of the worm; and

Figure 3:
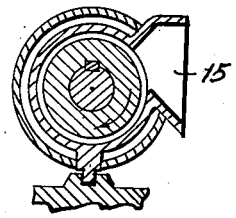

Figure 3 a cross section through the machine on line 3—3 of Figure 1.

The worm 1 forms, together with the casing 2, a toothed wheel 3 and the shaft 4, a unit connected by bearings 5, 6, 7 and the frame 8 of the machine. A lug 9 which engages in the groove of a projection 10 enables the casing 2 to be axially displaced, whilst preventing it from being carried round by the rotary motion of the worm. Through this axial displacement of the casing 2, which is brought about by the action of pressure fluid in the chambers 16 on the ring 17, the requisite space between the surface of the worm 1 and the internal surface of the casing 2 is adjusted and maintained. The supply of pressure fluid to the chambers 16 is controlled by an adjustable reducing and distributing valve 28 provided in the supply pipe 30. The reference numeral 31 in Figure 1 designates a waste pipe, while a pressure gauge is indicated by the numeral 29. For this purpose both the worm and the hollow space of the casing are made conical. For the mode of operation of the machine it is of advantage for the conical angle of the worm to differ slightly from the conical angle of the hollow space of the casing, namely in such a manner that the space between the worm and the hollow space of the casing gradually tapers in the direction of the increasing diameters of the two cones. According to the nature of the mass being operated on the angles of conicity of the worm and the casing differ from one another by from 0° to 5°.

The branches 18 and 19 lead to the inlet and outlet opening for cooling liquid which circulates in the space 20 between the double walls of the casing. Through a pipe 24 in the centre of the shaft 4, the bore 21 and openings 22, also in the shaft, cooling liquid is conveyed into the hollow space inside the worm 1. The cooling liquid is drained away from the worm through openings 23 and around the pipe 24. The branches 25 and 26 serve for the inflow and outflow of the liquid.

The mass to be homogenized enters the machine through the hopper 11, at the outlet end of which the mass is seized by the thread 12 at the inlet end of the rotating worm and is pushed forward against the helical ribs 13 (Figure 2) on the widening diameter of the worm cone. The mass then proceeds through the helical space between the helical ribs and is forced through between the surface of the bridging pieces 14 and the wall of the hollow space of the working casing. After reaching the recess 27 at the greatest diameter of the worm cone the already homogenized mass leaves the machine through the funnel-shaped outlet 15 (Figure 3). By adjusting the hydraulic pressure in the chamber 16 the relative position of the worm and the working casing is maintained in such a manner that the most suitable size of gap between the worm cone and the surface of the bridging pieces and the conical wall of the hollow space of the casing results.

I claim:

1. A machine for the continuous homogenization of plastic masses, comprising a working casing, a worm rotatably mounted in the working casing, with but small clearance space between the external periphery of the worm and the internal periphery of the casing, an inlet for admitting plastic material to the said clearance space, an outlet for homogenized material from the clearance space, bridging pieces interrupting the continuity of the space between the turns of the worm thread, and hydraulic pressure means coacting with the worm and casing for relative movement in an endwise direction for adjusting the clearance between said worm and casing in opposition to the axial component of the thrust of the plastic material against the internal surface of the casing.

2. A machine for the continuous homogenization of plastic masses, comprising an internally conical working casing, an externally conical worm rotatably and coaxially mounted in the working casing with but small clearance space between the external periphery of the worm and the internal periphery of the casing, an inlet for admitting plastic material to the said clearance space, an outlet for homogenized material from the clearance space, bridging pieces interrupting the continuity of the space between the turns of the worm thread, hydraulic pressure means adapted to move the worm relative to the casing in an endwise direction, so that by varying the magnitude of hydraulic pressure, the clearance between the internal peripheral surface of the casing and the external peripheral surface of the worm and bridging pieces will be adjusted to the value most suitable for the work in hand.

ARNOŠT KRUZIK.

REFERENCES CITED

The following references are of record in the file of this patent:

UNITED STATES PATENTS

| Number | Name | Date |
|---|---|---|
| 443,589 | Woodruff | Dec. 30, 1890 |
| 481,882 | Woodruff | Aug. 30, 1892 |
| 1,156,096 | Price | Oct. 12, 1915 |
| 1,825,475 | Pfeiffer | Sept. 29, 1931 |
| 1,935,050 | Gordon | Nov. 14, 1933 |
| 2,378,539 | Dawhihl | June 19, 1945 |

FOREIGN PATENTS

| Number | Country | Date |
|---|---|---|
| 409,577 | Germany | Feb. 7, 1925 |